United States Patent
Guo et al.

(10) Patent No.: US 9,979,784 B2
(45) Date of Patent: May 22, 2018

(54) METHOD FOR CLOUD DATA BACKUP AND RECOVERY

(71) Applicant: HUIZHOU TCL MOBILE COMMUNICATION CO., LTD., Huizhou, Guangdong (CN)

(72) Inventors: Hanlin Guo, Huizhou (CN); Xi Li, Huizhou (CN)

(73) Assignee: HUIZHOU TCL MOBILE COMMUNICATION CO., LTD., Huozhou, Guangdong (CN)

( * ) Notice: Subject to any disclaimer, the term of this patent is extended or adjusted under 35 U.S.C. 154(b) by 220 days.

(21) Appl. No.: 14/901,207

(22) PCT Filed: Jan. 20, 2015

(86) PCT No.: PCT/CN2015/071088
§ 371 (c)(1),
(2) Date: Dec. 28, 2015

(87) PCT Pub. No.: WO2016/033929
PCT Pub. Date: Mar. 10, 2016

(65) Prior Publication Data
US 2016/0212207 A1     Jul. 21, 2016

(30) Foreign Application Priority Data
Sep. 3, 2014 (CN) .......................... 2014 1 0447255

(51) Int. Cl.
*G06F 13/00* (2006.01)
*H04L 29/08* (2006.01)
*H04L 29/06* (2006.01)

(52) U.S. Cl.
CPC .......... *H04L 67/1095* (2013.01); *H04L 29/08* (2013.01); *H04L 63/083* (2013.01);
(Continued)

(58) Field of Classification Search
CPC ..... H04L 29/08; H04L 63/083; H04L 63/102; H04L 67/06; H04L 67/1095; H04L 67/1097; H04L 67/42; H04L 63/123
(Continued)

(56) References Cited

U.S. PATENT DOCUMENTS

2011/0258461 A1* 10/2011 Bates .................. G06F 11/1435
                                                          713/190
2014/0222761 A1   8/2014 Zhang et al.
2014/0379648 A1* 12/2014 Chiu ................ G06F 17/30174
                                                          707/624

FOREIGN PATENT DOCUMENTS

CN       102508735 A     6/2012
CN       102546756       7/2012
(Continued)

*Primary Examiner* — Kenneth R Coulter
(74) *Attorney, Agent, or Firm* — Ladas & Parry LLP

(57) ABSTRACT

A method for backing cloud data up and a method for recovering cloud data are provided. A cloud server and a client device are connected to a cloud network. The method for backing cloud data up includes: using the client device to obtain an installed application list and to show the installed application list; using the client device to choose a application in the application list; using the client device to obtain a access path where the backup of the application data file in the client device is and to transmit the access path and a backup of the application data file to the cloud server; and using the cloud server to save the access path and the corresponding backup of the application data file. By using the present inventive method, any user's chosen data can be shared among the cloud server and the client device.

10 Claims, 6 Drawing Sheets

(52) U.S. Cl.
CPC .......... *H04L 63/102* (2013.01); *H04L 63/123* (2013.01); *H04L 67/06* (2013.01); *H04L 67/1097* (2013.01); *H04L 67/42* (2013.01)

(58) Field of Classification Search
USPC ................. 709/225, 226, 229, 248, 213–219
See application file for complete search history.

(56) References Cited

FOREIGN PATENT DOCUMENTS

| | | |
|---|---|---|
| CN | 103607600 | 2/2014 |
| CN | 103631678 A | 3/2014 |

\* cited by examiner

METHOD FOR CLOUD DATA BACKUP AND RECOVERY

CROSS REFERENCE TO RELATED APPLICATION

This application claims the priority of International Application No. PCT/CN2015/071088, filed on Jan. 20, 2015, which claims priority to Chinese Application No. 2014104447255.2, filed on Sep. 3, 2014. The entire disclosures of each of the above applications are incorporated herein by reference.

BACKGROUND OF THE INVENTION

1. Field of the Invention

The present invention relates to the field of synchronization management based on the data of cloud services, and more particularly, to method of cloud data backup and recovery.

2. Description of the Prior Art

With rapid development of mobile devices, synchronizing backup of cloud data for the mobile devices is frequently used. Cloud data synchronization is defined as a data backup between a client device and a cloud server or as share of data among different client devices.

Cloud data synchronization is realized whenever users use tools, such as Baidu cloud, 360 cloud, and Tencent cloud, in conventional technology. But these tools can only store and back up predetermined fixed data such as files, photos, and contact information. The conventional technology cannot satisfy user's demands apparently when users want to move the stored data, such as chat records, browser history, or application data files, according to optional cloud backup by life or work. In other words, how different data can be shared by different users and how lost or damaged data can be retained from the mobile device are problems needed to be resolved.

SUMMARY OF THE INVENTION

In view of this, a method for cloud data backup and recovery is proposed by the present invention to resolve the problems occurring in the conventional technology for realizing share of different data among different devices depending on user's demands.

According to the present invention, a method for backing cloud data up is provided. A cloud server and a client device are connected to a cloud network. The method comprises: using the client device to obtain an installed application list and to show the installed application list; using the client device to choose one or more applications in the application list according to a user's first input; using the client device to obtain a first access path indicating to a path where the backup of the application data file in the client device is and to transmit the first access path and a backup of the application data file in the first access path to the cloud server; using the cloud server to save the first access path and the corresponding backup of the application data file; using the client device to obtain folders in a file system and show the folder; using the client device to choose one or more folders according to a user's second input; using the client device to obtain a second access path indicating to a path where the one or more folders chosen by the user is and to transmit the second access path and a backup of the one or more folders in the second access path to the cloud server; using the cloud server to save the second access path and the backup of the one or more folders. A step of using the client device to obtain a first access path indicating to a path where the backup of the application data file in the client device is further comprises: using the client device to determine if the contents are updated according to the application data file; if the contents are updated, using the client device to transmit a backup of the updated contents to the cloud server; using the cloud server to update the backup of the application data file based on the updated contents.

Furthermore, a step of using the client device to obtain a second access path indicating to a path where the one or more folders chosen by the user is comprises: using the client device to detect if the contents of the one or more folders in the second access path have an updated log information; using the client device to obtain the updated contents of the one or more folders based on the updated log information if there is updated log information; using the client device to transmit a backup of the contents of the one or more folder to the cloud server; and using the cloud server to update the backup of the contents of the one or more folders based on the updated contents of the one or more folders.

Furthermore, before the step of using the client device to obtain a first access path indicating to a path where the backup of the application data file in the client device is and to transmit the first access path and a backup of the application data file in the first access path to the cloud server, the method further comprises a step of verifying the user's identification and the step comprises: using the client device to provide an input interface for the user to input an account and a password; using the client device to transmit the account and the password inputted by the user to the cloud server which stores a registered account and a corresponding password; using the cloud server to determine if the account and the password inputted by the user match the account and the password registered on the cloud server, a message of passing verification being transmitted to the client device if they are matched, and a message of verification failure being transmitted to the client device if they are not matched; the step of using the client device to obtain a second access path where an application data file chosen by the user is and to transmit the second access path and a backup of the application data file in the second access path to the cloud server, comprises: using the client device to obtain the first access path where the application data file chosen by the user is after responding to the message of passing verification and transmit the first access path and the backup of the application data file in the first access path to the cloud server.

According to the present invention, a method for backing cloud data up is provided. A cloud server and a client device are connected to a cloud network. The method comprises: using the client device to obtain an installed application list and to show the installed application list; using the client device to choose one or more applications in the application list according to a user's first input; using the client device to obtain a first access path indicating to a path where the backup of the application data file in the client device is and to transmit the first access path and a backup of the application data file in the first access path to the cloud server; and using the cloud server to save the first access path and the corresponding backup of the application data file.

Furthermore, a step of using the client device to obtain a first access path indicating to a path where the backup of the application data file in the client device is further comprises: using the client device to determine if the contents are updated according to the application data file; if the contents are updated, using the client device to transmit a backup of the updated contents to the cloud server; using the cloud server to update the backup of the application data file based on the updated contents.

Furthermore, the method further comprises: using the client device to obtain folders in a file system and show the folder; using the client device to choose one or more folders according to a user's second input; using the client device to obtain a second access path indicating to a path where the one or more folders chosen by the user is and to transmit the second access path and a backup of the one or more folders in the second access path to the cloud server; and using the cloud server to save the second access path and the backup of the one or more folders.

Furthermore, a step of using the client device to obtain a second access path indicating to a path where the one or more folders chosen by the user is comprises: using the client device to detect if the contents of the one or more folders in the second access path have an updated log information; using the client device to obtain the updated contents of the one or more folders based on the updated log information if there is updated log information; using the client device to transmit a backup of the contents of the one or more folder to the cloud server; and using the cloud server to update the backup of the contents of the one or more folders based on the updated contents of the one or more folders.

Furthermore, before the step of using the client device to obtain a first access path indicating to a path where the backup of the application data file in the client device is and to transmit the first access path and a backup of the application data file in the first access path to the cloud server, the method further comprises a step of verifying the user's identification and the step comprises: using the client device to provide an input interface for the user to input an account and a password; using the client device to transmit the account and the password inputted by the user to the cloud server which stores a registered account and a corresponding password; using the cloud server to determine if the account and the password inputted by the user match the account and the password registered on the cloud server, a message of passing verification being transmitted to the client device if they are matched, and a message of verification failure being transmitted to the client device if they are not matched; the step of using the client device to obtain a second access path where an application data file chosen by the user is and to transmit the second access path and a backup of the application data file in the second access path to the cloud server, comprises: using the client device to obtain the first access path where the application data file chosen by the user is after responding to the message of passing verification and transmit the first access path and the backup of the application data file in the first access path to the cloud server.

According to the present invention, a method for recovering cloud data is provided. A cloud server and a client device are connected to a cloud network, the cloud server saving a backup of the application data file needed for data recovery in the client device and a first access path indicating to a path where the backup of the application data file in the client device is. The method comprises: using the client device to transmit a first data recovery command to the cloud server; using the cloud server to back the application data file up according to the data recovery command and to transmit the first access path to the client device; and using the client device to save the backup of the application data file in the first access path so that the backup of the application data file is transferred to the client device when the application which the backup of the application data file corresponds to is running.

Furthermore, a step of using the cloud server to back the application data file up according to the data recovery command and to transmit the first access path to the client device further comprises: using the cloud server to obtain a configuration file of the application data file needed to be recovered according to the data recovery command; using the client device to obtain the configuration file and match the local effective application based on the configuration file; using the client device to obtain the effective application and transmit the backup of the application data file to which the effective application corresponds to the client device; using the cloud server to recover the backup of the first access path when the client device does a backup based on the application data file which the effective application corresponds to.

Furthermore, the method further comprises: using the client device to respond to user's second entry of the file recovery command and transmit to the cloud server; using the cloud server to transmit the contents of the folder needed to be recovered and the second access path where the folder is to the client device according to the file recovery command; using the cloud server to save the backup of the contents of the folder to the second access path so that the backup of the contents of the folder is transferred when the contents of the folder is in use.

Furthermore, a step of the cloud server transmitting the contents of the folder needed to be recovered and the second access path where the folder is to the client device according to the file recovery command further comprises: using the cloud server to obtain a configuration file of a folder needed to be recovered according to the file recovery command; using the client device to obtain the configuration file and matching a local first folder according to the configuration file for determining if the local first folder is lost; using the client device to set up a second folder if being lost; using the cloud server to transmit the contents of the folder needed to be recovered and a second access path where the folder is to the client device; using the client device to save the contents of the folder to the second folder and recover the second access path according to the second folder.

Furthermore, before using the client device to respond to the first data recovery command and transmit to the cloud server, the method further comprises a step of verifying the user's identification and the step comprises: using the client device to provide an input interface for the user to enter an account and a corresponding password; using the client device to transmit the account and the password inputted by the user to the cloud server which stores a registered account and a corresponding password; using the cloud server to determine if the account and the password inputted by the user match the account and the password registered on the cloud server, a message of passing verification being transmitted to the client device if they are matched, and a message of verification failure being transmitted to the client device if they are not matched; using the client device to respond to the first data recovery command to the cloud server comprises: using the client device to respond to the first data recovery command to the cloud server after responding to the message of passing verification.

The benefit provided by the embodiment of the present invention is: The cloud server and the client device are connected to the cloud network. A client device obtains an installed application list and chooses one or more applications. The client device obtains an access path which leads to where a user's chosen application data file is and transmits the access path and a backup of the application data file to the cloud server. The user's chosen application data file is backed up in the cloud server. So any user's chosen data can be shared between the cloud server and the client device. Once the data stored in the client device is lost or failure, the data can be recovered through the backup data in the cloud server. In this way, intellectualization is fully realized.

DETAILED DESCRIPTION OF THE PREFERRED EMBODIMENTS

In order to illustrate the technique and effects of the present invention, a detailed description will be disclosed by the following disclosure in conjunction with figures. It is noted that the same components are labeled by the same number.

Figure 1:
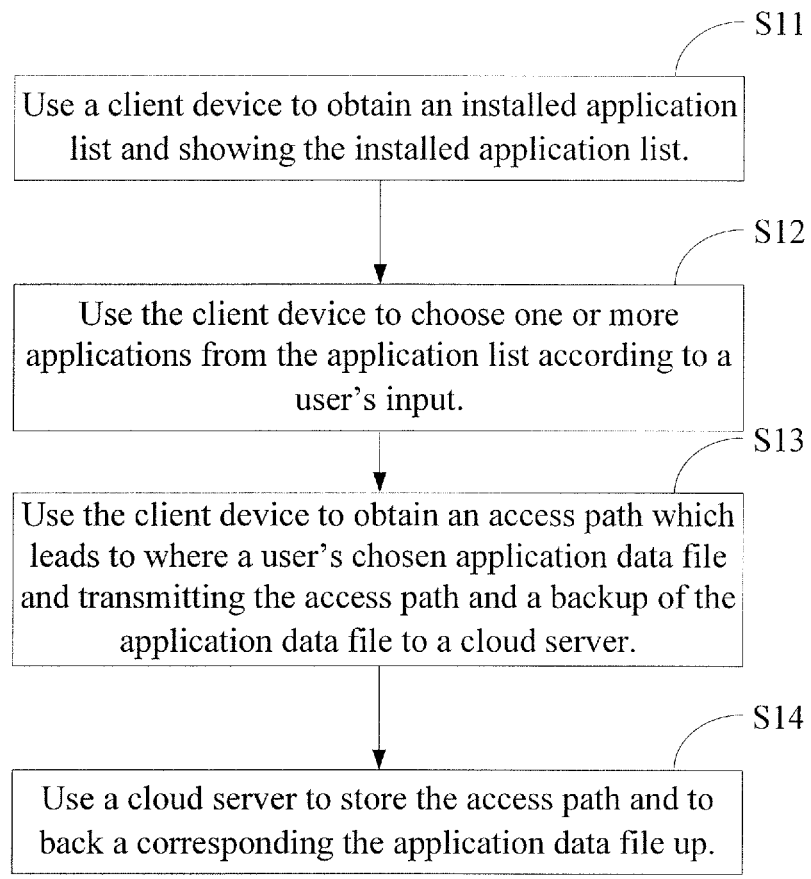
FIG. 1 is a flowchart of a method for backing cloud data up according to a first embodiment of the present invention.

It has been a habit for people in the modern society to back a data file stored in a client device up periodically. FIG. 1 is a flowchart of a method for backing cloud data up according to a first embodiment of the present invention. The method proposed by the first embodiment for backing cloud data up comprises following steps of:

Step S11: Use a client device to obtain an installed application list and showing the installed application list.

All locally installed applications, such as QQ, office, antivirus software, browser, and game application, are acquired by the client device, and all of the locally installed applications are listed on an operational interface.

Step S12: Use the client device to choose one or more applications from the application list according to a user's input.

The user enables one or more applications on the operational interface where the application list is shown according to his/her need such as only choosing a game application or choosing a game application, QQ, and other arbitrary applications at the same time. Enabling the one or more applications in this embodiment is practically realized by clicking the applications shown on the operational interface.

Step S13: Use the client device to obtain an access path which leads to where a user's chosen application data file and transmitting the access path and a backup of the application data file to a cloud server.

The access path refers to a storage location where the application data file is stored in the local client device in this embodiment. The client device transmits the access path and a backup of the application data file to a cloud server.

Step S14: Use a cloud server to store the access path and to back a corresponding the application data file up.

The application data file is stored in a corresponding access path of the cloud server. The application data file and the corresponding access path are stored and backed up in the cloud server together, thereby storing the access path and backing the corresponding application data file up.

The above-mentioned four steps work under the premise that the cloud server and the client device are connected to the cloud network in this embodiment. That is, the cloud server and the client device need to be connected through the network. In this way, the application data file can be transmitted to the server from the client device for a backup. Preferably, the network connection can be a wire connection or a wireless fidelity (Wi-Fi) connection.

Figure 2:
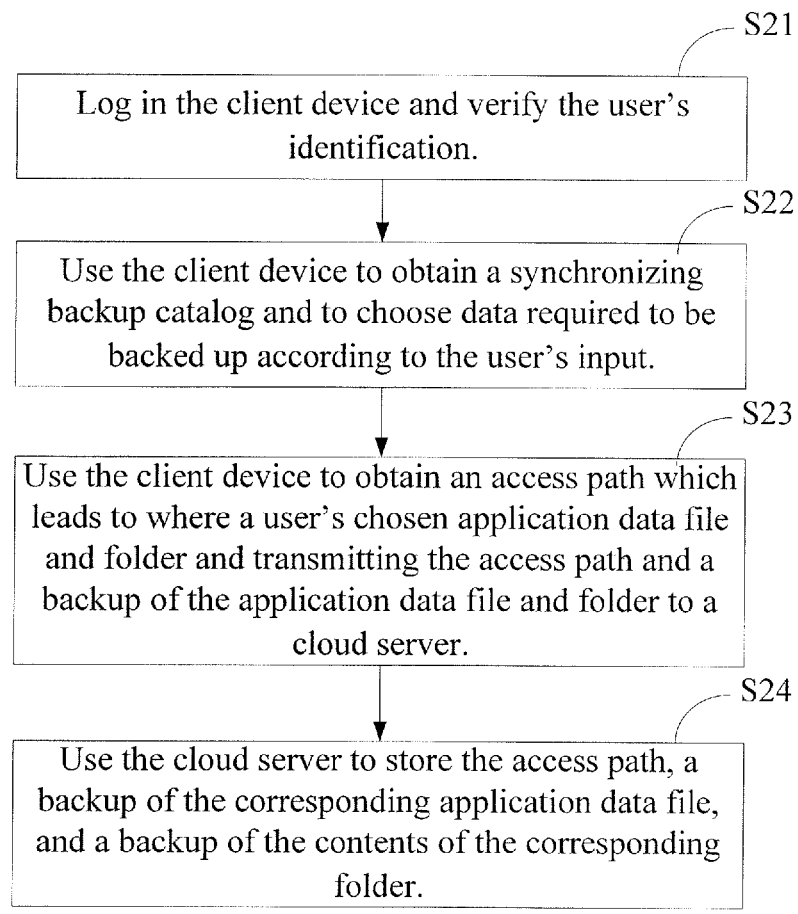
FIG. 2 is a flowchart of a method for backing cloud data up according to a second embodiment of the present invention.

FIG. 2 is a flowchart of a method for backing cloud data up according to a second embodiment of the present invention. The method proposed by the second embodiment is elaborated based on the method proposed by the first embodiment. The method proposed by the second embodiment for backing cloud data up comprises following steps of:

Step S21: Log in the client device and verify the user's identification.

A request for logging in the user's account and inputting the user's password is shown on the operational interface of the client device. The user's account and the password are transmitted to the cloud server. The user's account and the password have been registered and stored on the cloud server. The cloud server determines if the user's account and the password inputted by the user match the user's account and the user's password stored on the cloud server. If both are identical, a feedback of passing verification is sent to the client device. Then, Step S22 is activated. If both are different, a feedback of failing verification is given to the client device. Then, the message of failure verification is shown on the operational interface of the client device. A message of reentering a correct user's account and a correct user's password is also shown on the operational interface of the client device.

Step S21 is a crucial step in this embodiment. Because of Step S21 of verifying the user's identification through the user's account and the user's password, the user's personal information is prevented from making public. In other words, the user's personal information is ensured.

Step S22: Use the client device to obtain a synchronizing backup catalog and to choose data required to be backed up according to the user's input. The contents of the data comprise:

The user chooses one or more applications required to be backed up from the application list; and The user chooses one or a plurality of folders required to be backed up from the documentation system.

It is possible to choose the applications and folders at the same time. It is also possible to choose one or more applications required to be backed up or one or more folders required to be backed up step by step. It depends on the user's demand. Intellectualization is fully realized.

The corresponding account predetermines to synchronize a necessary backup catalog. The catalog comprises an application list formed when the application is installed and a folder in the file system. The user can also register several accounts as his/her demand. Each account responds to different messages about the backup catalog, thereby realising intellectualization.

Step S23: Use the client device to obtain an access path which leads to where a user's chosen application data file and folder and transmitting the access path and a backup of the application data file and folder to a cloud server.

Step S24: Use the cloud server to store the access path, a backup of the corresponding application data file, and a backup of the contents of the corresponding folder.

The above-mentioned four steps work under the premise that the cloud server and the client device are connected to the cloud network in this embodiment. The operation principle for this embodiment is the same as that for the first embodiment, so no details will be provided here.

Because it takes a large amount of flow and a lot of time to transmitting the application data file, the contents of the folder, and the access path in the second embodiment, a third embodiment about backing the cloud data up is proposed.

Figure 3:
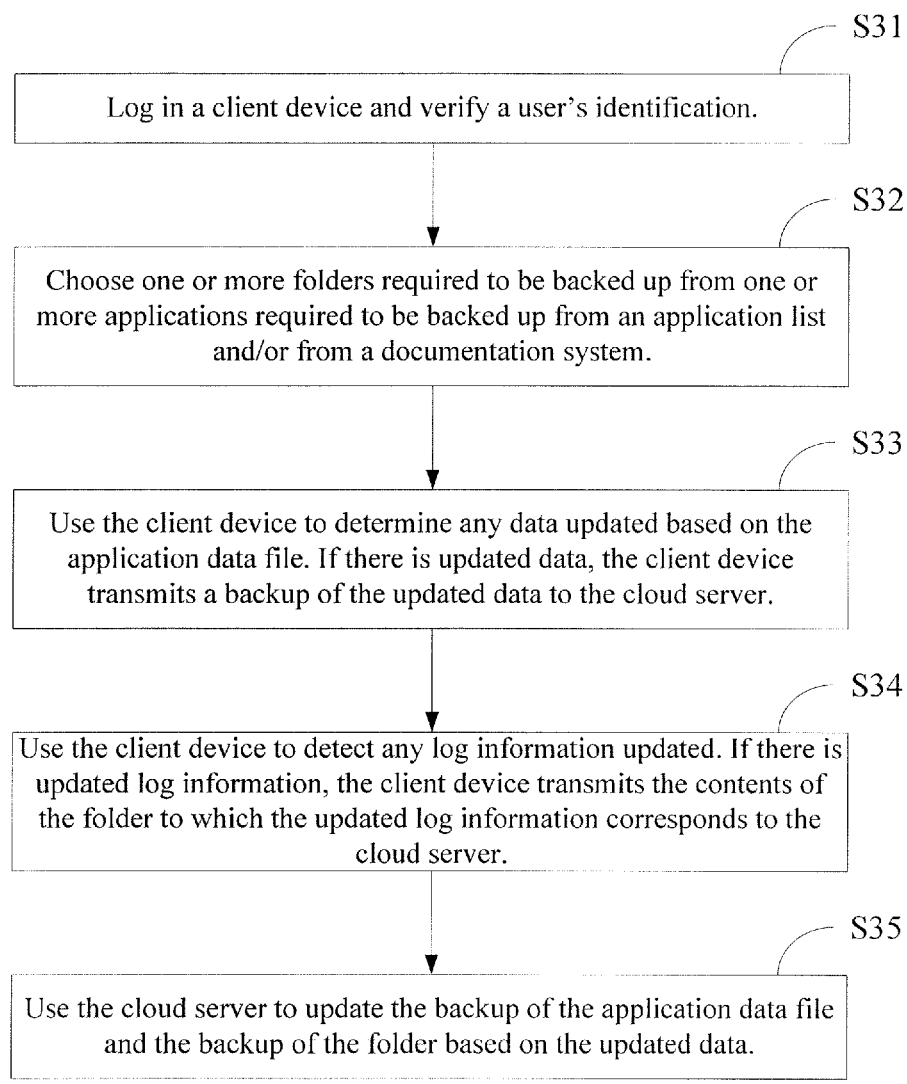
FIG. 3 is a flowchart of a method for backing cloud data up according to a third embodiment of the present invention.

FIG. 3 is a flowchart of a method for backing the cloud data up according to a third embodiment of the present invention. The method for backing the cloud data up comprises following steps of:

Step S31: Log in a client device and verify a user's identification.

Step S32: Choose one or more folders required to be backed up from one or more applications required to be backed up from an application list and/or from a documentation system.

Different from the method for backing the cloud data up proposed by the second embodiment, the method proposed by this embodiment is that transmission of application and transmission of folder are done separately while the backup of the updated information is done simultaneously, as introduced in the following Step S33 and Step S34.

Step S33: Use the client device to determine any data updated based on the application data file. If there is updated data, the client device transmits a backup of the updated data to the cloud server.

Step S34: Use the client device to detect any log information updated. If there is updated log information, the client device transmits the contents of the folder to which the updated log information corresponds to the cloud server.

When data is updated and sensed the updated data is transmitted to the cloud server directly according to Step S33 and Step S34 based on the last operation since the client device has transmitted the backup of data to the cloud server for several times.

Step S35: Use the cloud server to update the backup of the application data file and the backup of the folder based on the updated data.

Update means that the backup of the application data file and the backup of the folder are done. In other words, update is done when both of the application data file and the folder are backed up in this embodiment.

The updated data is directly stored to the access path which the cloud server corresponds to. For example, the updated data is directly transmitted to the access path for the QQ application data file in the cloud server if the data of the QQ application of the user' device is updated.

The above-mentioned five steps work under the premise that the cloud server and the client device are connected to the cloud network in this embodiment. The operation principle for this embodiment is the same as that for the first embodiment, so no details will be provided herein.

Figure 4:
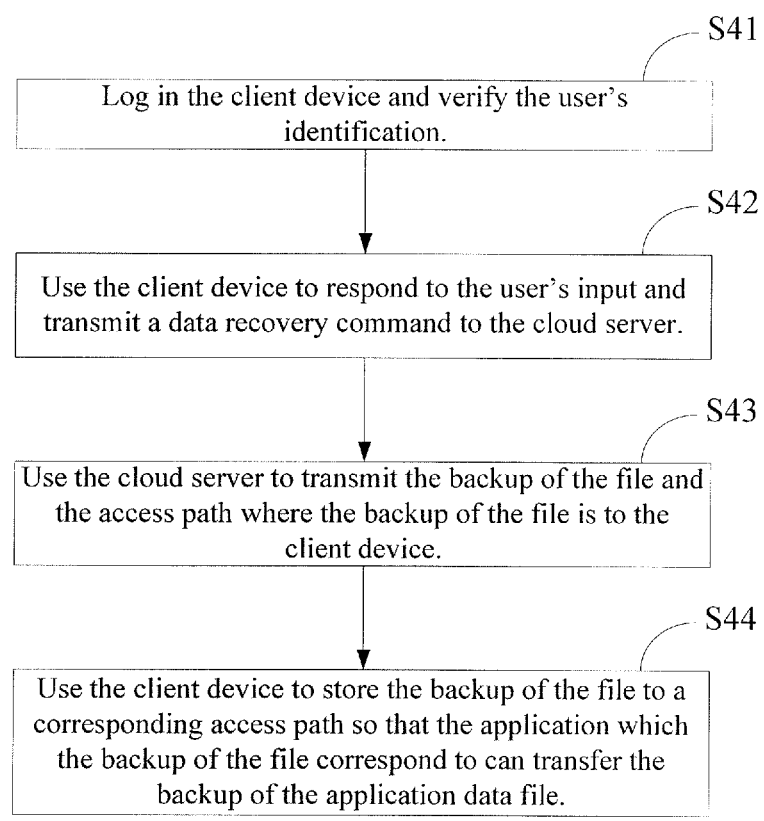
FIG. 4 is a flowchart of the method for recovering the cloud data according to the first embodiment of the present invention.

The recovery of the cloud data and the backup of the cloud data are set up correspondingly. The message of the data can be shared by the client device and the cloud service through backup and recovery. The recovery of the cloud data is conducted only when the backup file for recovering data in the client device and the access path of the client device are stored in the cloud server. FIG. 4 is a flowchart of the method for recovering the cloud data according to the first embodiment of the present invention. The method for recovering the cloud data comprises steps of:

Step S41: Log in the client device and verify the user's identification.

The operation principle for logging in the device and verifying the user's identification and the method for backing the cloud data up in this embodiment are the same as the operation principle and the method elaborated in the other embodiments. There will be no details provided herein.

Step S42: Use the client device to respond to the user's input and transmit a data recovery command to the cloud server.

The backup of the file on the cloud server comprises a application data file and a folder file so two methods can be chosen in Step S42:

Using the client device to respond to the user's input and transmit a data recovery command to the cloud server;

Using the client device to respond to the user's input and transmit a file recovery command to the cloud server.

The client device chooses corresponding application data files or folders according to the user's recovery command in this embodiment. The data recovery command or the file recovery command is set as a command of recovering part of the data or all of the data or all of the contents of the file according to the user's need. For example, the user can send a command of recovering the QQ application to the cloud server to recover the QQ application after reloading the system once some data is lost in the operating device due to the reloading system of the device or virus infection.

In addition, the client device indicates the device which the user is in use. For example, the user uses another electronic device at work or in life, lie needs all of the backup data stored in the cloud server. The user also needs to send the data recovery command and the file recovery command to the server together. Furthermore, the user needs to download the backup of the application data and the backup of the file in the folder to a new electronic device.

Step S43: Use the cloud server to transmit the backup of the file and the access path where the backup of the file is to the client device.

Step S44: Use the client device to store the backup of the file to a corresponding access path so that the application which the backup of the file correspond to can transfer the backup of the application data file.

If the application data file is recovered, the application data file is stored in the access path of the client device in this embodiment so that the backup of the application data file can be transferred when the application which the backup of application data file corresponds to is working. If the contents of the folder is recovered, the contents of the folder are stored in the corresponding access path so that the backup of the contents of the folder can transferred when the contents of the folder are used.

The above-mentioned four steps work under the premise that the cloud server and the client device are connected to the cloud network in this embodiment. The operation principle for this embodiment is the same as the method for backing the cloud data up for the embodiments, so no details will be provided here.

Figure 5:
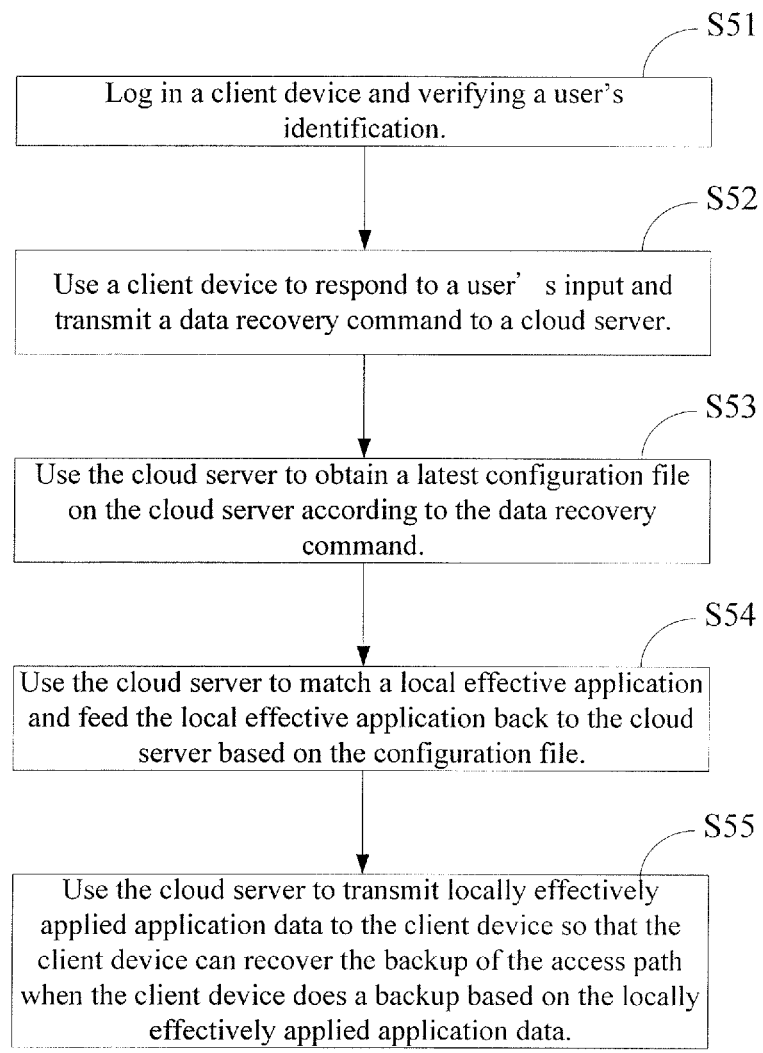
FIG. 5 is a flowchart of the method for recovering the cloud data according to the second embodiment of the present invention.

The cloud server regularly updates some applications, data, files, and configuration files. Therefore, the latest configuration files can be also downloaded to the access path of the local client device through the data recovery command sent by the user, as FIG. 5 shows. Further, a method for recovering cloud data is proposed by the second embodiment of the present invention. The method for recovering cloud data comprises steps of:

Step S51: Log in a client device and verifying a user's identification.

Step S52: Use a client device to respond to a user's input and transmit a data recovery command to a cloud server.

What Step S51 and Step S52 explain is the same as what is described in the first embodiment, and no repetition will be given in the following descriptions. A difference of the steps between the two embodiments is that the recovery of the application data file and the recovery of the folder in the present embodiment are done separately while the recovery of the application data file and the recovery of the folder are operated synchronously. That is:

Step S53: Use the cloud server to obtain a latest configuration file on the cloud server according to the data recovery command.

Step S54: Use the cloud server to match a local effective application and feed the local effective application back to the cloud server based on the configuration file.

Step S55: Use the cloud server to transmit locally effectively applied application data to the client device so that the client device can recover the backup of the access path when the client device does a backup based on the locally effectively applied application data.

With the above-mentioned method, the configuration files of the cloud server is obtained firstly, and then the local effective application is sensed based on the list formed by the configuration files. The aim is to prevent a condition that the data which the application corresponds to cannot be recovered once some application is not installed in the new electronic device. Based on this, once the effective application installed in the local electronic device is sensed, it only needs to download the latest data of the localled installed application to the local electronic device from the cloud server.

In addition, steps of recovering the data of the fixed folder comprise:

Using the cloud server to obtain a latest configuration file on the cloud server according to the file recovery command.

The client device senses if a local folder is lost based on the latest configuration file and feeds a message of the lost folder back to the cloud server.

A folder responding to deficiencies is created in the client device. Also, a file is downloaded from the cloud server to a corresponding folder. The backup of the access path is recovered based on the folder.

Figure 6:
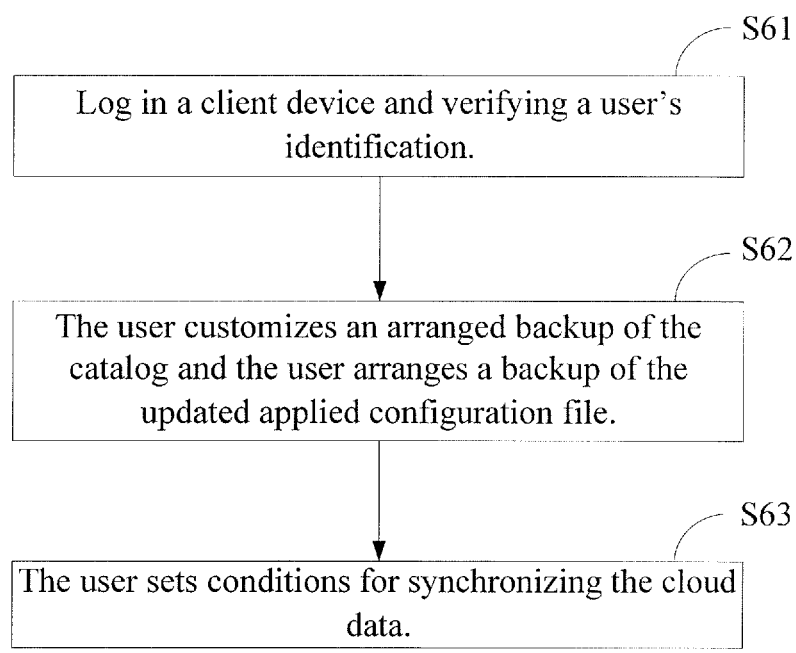
FIG. 6 is a method for synchronizing a cloud data according to the present invention.

The backup of the cloud data and the method for recovery proposed by the embodiment is realized when the user logs in his/her account. Based on this, a method for synchronizing a cloud data is proposed by the present invention. Please refer to FIG. 6. A method for synchronizing a cloud data in this embodiment comprises:

Step S61: Log in a client device and verifying a user's identification.

Simultaneous communication is related to user's personal data. Since it is more classified, the user is asked to sign up an account when using cloud simultaneous data the first time. When using simultaneous communication again, the user is asked to verify identification through his/her account and password. The user can also sign up several accounts as his/her demand for different backup strategies planned for different senses. The user customizes the backups of different data according to different accounts. Whenever the suer signs up a new account and logs in, the system gives a message of backing up again, thereby realising intellectualization.

When the user needs to enable the communication function, he/she enter his/her account and corresponding password to the operational interface which asks an entry of an account and a password in the present embodiment. After the user's account and password are verified, the operational interface will jump to an interface customized by the cloud simultaneous data.

Step S62: The user customizes an arranged backup of the catalog and the user arranges a backup of the updated applied configuration file.

The user customizes the arranged backup of the catalog and the user designates some folders in the folder system to folders needed to be backed up according to his/her demand. Meanwhile, the application list is obtained from the client device and an application needed to be backed up is designated. A plurality of folders and applications needed to synchronized can be designated or different folders and applications can be designated in different accounts in this embodiment. The backup catalog comprises not only designated applications and folders but also the application data files needed to be recorded and the access path where the files in the folders are.

The backup and updated application data file is an application data file chosen and updated by the user. The backup and updated application data file communicates with the cloud server. The latest configuration file of the application from the cloud server matches the local file. After updated data is sensed, the latest configuration file is downloaded to an access path which the local client device corresponds to and is updated.

Step S63: The user sets conditions for synchronizing the cloud data.

The synchronization conditions depend on frequency and network environment in this embodiment. The synchronous frequency can be set to be manual or automatic by the user. Automatic synchronization can be set as synchronization once a day or once a week based on the user's need. Manual synchronization is successful only in the condition of manual choice. Preferably, synchronization arrangement is set to be automatic. The synchronizing environment is set to be performed in any kind of network. Since synchronization needs larger amount of flow, it is possible to set the condition of synchronization only in WiFi network.

All data needed to be backed up, synchronous frequencies, and network environment are defined depending on the user's demand through the above-mentioned method. Because the data is classified, any user needs to sign up an account when using the first time for protection of personal information. It is necessary to verify the user's identification in subsequent setup of backup data, backup, and recovery of data. Moreover, the user can sign up another account to define backups differently depending on his/her demand. The user's demand for different kinds of backup data can be satisfied.

To sum up, the client device obtains an installed application list and chooses one or more applications. The client device obtains the access path which leads to where a user's chosen application data file and transmits the access path and the backup of the application data file to the cloud server. The user's chosen application data file is backed up in the cloud server. So any user's chosen data can be shared between the cloud server and the client device. Once the data stored in the client device is lost or lost, the data can be recovered through the backup data in the cloud server. In this way, intellectualization is fully realized.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method for backing cloud data up, a cloud server and a client device connected to a cloud network, and the method comprising:

using the client device to obtain an installed application list;

using the client device to choose one or more applications in the application list according to a user's first input;

using the client device to obtain a first access path indicating to a path where a backup of a application data file in the client device is and to transmit the first access path and the backup of the application data file in the first access path to the cloud server;

using the cloud server to save the first access path and the corresponding backup of the application data file;

using the client device to obtain folders in a file system;

using the client device to choose one or more folders according to a user's second input;

using the client device to obtain a second access path indicating to a path where the one or more folders chosen by the user is and to transmit the second access path and a backup of the one or more folders in the second access path to the cloud server;

using the cloud server to save the second access path and the backup of the one or more folders;

wherein a step of using the client device to obtain a first access path indicating to a path where the backup of the application data file in the client device is further comprises:

using the client device to determine if the contents are updated according to the application data file;

if the contents are updated, using the client device to transmit a backup of the updated contents to the cloud server;

using the cloud server to update the backup of the application data file based on the updated contents, wherein a step of using the client device to obtain a second access path indicating to a path where the one or more folders chosen by the user is comprises:

using the client device to detect if the contents of the one or more folders in the second access path have an updated log information;

using the client device to obtain the updated contents of the one or more folders based on the updated log information if there is updated log information;

using the client device to transmit a backup of the contents of the one or more folder to the cloud server; and using the cloud server to update the backup of the contents of the one or more folders based on the updated contents of the one or more folders.

2. The method of claim 1, wherein before the step of using the client device to obtain a first access path indicating to a path where the backup of the application data file in the client device is and to transmit the first access path and a backup of the application data file in the first access path to the cloud server, the method further comprises a step of verifying the user's identification and the step comprises:

using the client device to provide an input interface for the user to input an account and a password;

using the client device to transmit the account and the password inputted by the user to the cloud server which stores a registered account and a corresponding password;

using the cloud server to transmit a message of passing verification to the client device if the account and the password inputted by the user match the account and the password registered on the cloud server, and to transmit a message of verification failure to the client device if the account and the password inputted by the user does not match the account and the password registered on the cloud server;

the step of using the client device to obtain a second access path where an application data file chosen by the user is and to transmit the second access path and a backup of the application data file in the second access path to the cloud server, comprises:

using the client device to obtain the first access path where the application data file chosen by the user is after responding to the message of passing verification and transmit the first access path and the backup of the application data file in the first access path to the cloud server.

3. The method of claim 1, wherein the cloud network is a WiFi network.

4. A method for backing cloud data up, a cloud server and a client device connected to a cloud network, and the method comprising:

using the client device to obtain an installed application list;

using the client device to choose one or more applications in the application list according to a user's first input;

using the client device to obtain a first access path indicating to a path where a backup of a application data file in the client device is and to transmit the first access path and the backup of the application data file in the first access path to the cloud server; and using the cloud server to save the first access path and the corresponding backup of the application data file;

using the client device to obtain folders in a file system and show the folder;

using the client device to choose one or more folders according to a user's second input;

using the client device to obtain a second access path indicating to a path where the one or more folders chosen by the user is and to transmit the second access path and a backup of the one or more folders in the second access path to the cloud server; and using the cloud server to save the second access path and the backup of the one or more folders;

wherein a step of using the client device to obtain a second access path indicating to a path where the one or more folders chosen by the user is comprises:

using the client device to detect if the contents of the one or more folders in the second access path have an updated log information;

using the client device to obtain the updated contents of the one or more folders based on the updated log information if there is updated log information;

using the client device to transmit a backup of the contents of the one or more folder to the cloud server; and using the cloud server to update the backup of the contents of the one or more folders based on the updated contents of the one or more folders.

5. The method of claim 4, wherein a step of using the client device to obtain a first access path indicating to a path where the backup of the application data file in the client device is further comprises:
  using the client device to determine if the contents are updated according to the application data file;
  if the contents are updated, using the client device to transmit a backup of the updated contents to the cloud server;
  using the cloud server to update the backup of the application data file based on the updated contents.

6. The method of claim 4, wherein before the step of using the client device to obtain a first access path indicating to a path where the backup of the application data file in the client device is and to transmit the first access path and a backup of the application data file in the first access path to the cloud server, the method further comprises a step of verifying the user's identification and the step comprises:
  using the client device to provide an input interface for the user to input an account and a password;
  using the client device to transmit the account and the password inputted by the user to the cloud server which stores a registered account and a corresponding password;
  using the cloud server to transmit a message of passing verification to the client device if the account and the password inputted by the user match the account and the password registered on the cloud server, and to transmit a message of verification failure to the client device if the account and the password inputted by the user does not match the account and the password registered on the cloud server;
  the step of using the client device to obtain a second access path where an application data file chosen by the user is and to transmit the second access path and a backup of the application data file in the second access path to the cloud server, comprises:
  using the client device to obtain the first access path where the application data file chosen by the user is after responding to the message of passing verification and transmit the first access path and the backup of the application data file in the first access path to the cloud server.

7. The method of claim 4, wherein the cloud network is a WiFi network.

8. A method for recovering cloud data, a cloud server and a client device connected to a cloud network, the cloud server saving a backup of the application data file needed for data recovery in the client device and a first access path indicating to a path where a backup of a application data file in the client device is, and the method comprising:
  using the client device to transmit a first data recovery command to the cloud server;
  using the cloud server to back the application data file up according to the data recovery command and to transmit the first access path to the client device; and
  using the client device to save the backup of the application data file in the first access path so that the backup of the application data file is transferred to the client device when the application which the backup of the application data file corresponds to is running;
  using the client device to respond to user's second entry of the file recovery command and transmit to the cloud server;
  using the cloud server to transmit the contents of the folder needed to be recovered and, the second access path where the folder is to the client device according to the file recovery command;
  using the cloud server to save the backup of the contents of the folder to the second access path so that the backup of the contents of the folder is transferred when the contents of the folder is in use,
  wherein a step of the cloud server transmitting the contents of the folder needed to be recovered and the second access path where the folder is to the client device according to the file recover command further comprises:
  using the cloud server to obtain a configuration file of a folder needed to be recovered according to the file recovery command;
  using the client device to obtain the configuration file and matching a local first folder according to the configuration file for determining if the local first folder is lost;
  using the client device to set up a second folder if being lost;
  using the cloud server to transmit the contents of the folder needed to be recovered and a second access path where the folder is to the client device;
  using the client device to save the contents of the folder to the second folder and recover the second access path according to the second folder.

9. The method of claim 8, wherein a step of using the cloud server to back the application data file up according to the data recovery command and to transmit the first access path to the client device further comprises:
  using the cloud server to obtain a configuration file of the application data file needed to be recovered according to the data recovery command;
  using the client device to obtain the configuration file and match the local effective application based on the configuration file;
  using the client device to obtain the effective application and transmit the backup of the application data file to which the effective application corresponds to the client device;
  using the cloud server to recover the backup of the first access path when the client device does a backup based on the application data file which the effective application corresponds to.

10. The method of claim 8, wherein before using the client device to respond to the first data recovery command and transmit to the cloud server, the method further comprises a step of verifying the user's identification and the step comprises:
  using the client device to provide an input interface for the user to enter an account and a corresponding password;
  using the client device to transmit the account and the password inputted by the user to the cloud server which stores a registered account and a corresponding password;
  using the cloud server to determine if the account and the password inputted by the user match the account and the password registered on the cloud server, a message of passing verification being transmitted to the client device if they are matched, and a message of verification failure being transmitted to the client device if they are not matched;
  using the client device to respond to the first data recovery command to the cloud server comprises:
  using the client device to respond to the first data recovery command to the cloud server after responding to the message of passing verification.

* * * * *